No. 711,437. Patented Oct. 14, 1902.
H. K. PELL.
SPRING COUPLING FOR VEHICLES.
(Application filed Feb. 10, 1902.)
(No Model.)
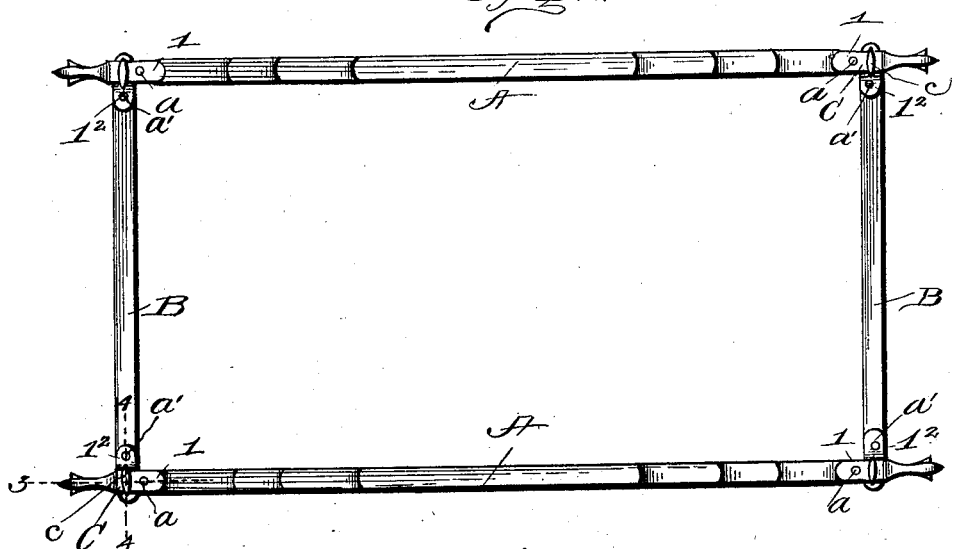
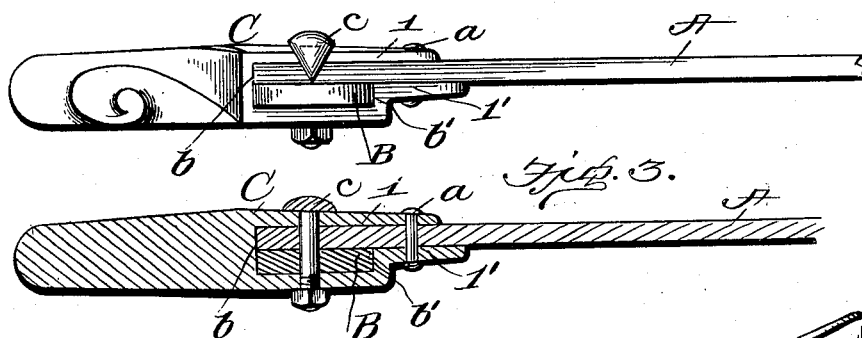
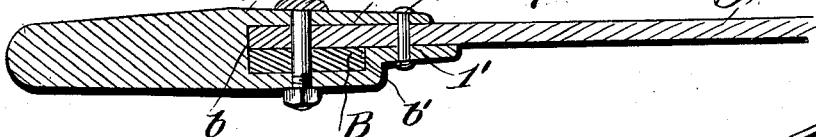
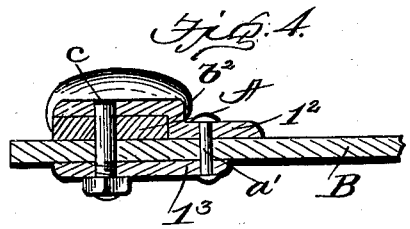
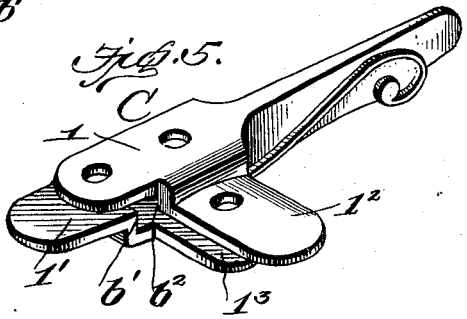
Witnesses
Inventor
H. K. Pell
By H. B. Willson & Co.
Attorneys
THE NORRIS PETERS CO., PHOTO-LITHO., WASHINGTON, D. C.

UNITED STATES PATENT OFFICE.

HENRY K. PELL, OF ROME, NEW YORK.

SPRING-COUPLING FOR VEHICLES.

SPECIFICATION forming part of Letters Patent No. 711,437, dated October 14, 1902.

Application filed February 10, 1902. Serial No. 93,390. (No model.)

*To all whom it may concern:*

Be it known that I, HENRY K. PELL, a citizen of the United States, residing at Rome, in the county of Oneida and State of New York, have invented certain new and useful Improvements in Spring-Couplings for Vehicles; and I do declare the following to be a full, clear, and exact description of the invention, such as will enable others skilled in the art to which it appertains to make and use the same.

This invention relates to couplings for connecting the ends of cross-springs to the ends of side springs of vehicles, and is designed as an improvement upon the construction shown in Patent No. 342,533, granted to Henry W. Pell May 25, 1886.

In the accompanying drawings, Figure 1 is a plan view of a set of vehicle-springs embodying my invention. Fig. 2 is an enlarged side view of one end of the springs connected by my improved coupling. Figs. 3 and 4 are enlarged sections taken, respectively, on the lines 3 3 and 4 4 of Fig. 1. Fig. 5 is a perspective view of the coupling.

In the patented construction referred to the lapping ends of the cross and side springs are connected by couplings, the lower lip of each of which is offset to form a shoulder which abuts against one side edge of the cross-spring and which is parallel with a shoulder $b$, which abuts against the end edge of the side spring and opposite side edge of the cross-spring. This prevents lateral motion of the cross-spring and longitudinal motion of the side spring, but does not effectually prevent longitudinal shifting of the cross-spring and lateral shifting of the side spring, so that in time the ends of the springs work loose and become displaced and exert undue wear and strain on the fastenings connecting the parts together. The object of this invention is to provide a construction of coupling which will obviate this objection.

Similar letters of reference indicate corresponding parts.

A A and B B represent, respectively, the side springs and cross-springs of a vehicle. These springs I couple together by lapping the end of one across the end of the other and generally the end of the side spring across the top of the end of the cross-spring. A coupling-head C is made to project from the end of the side spring and preferably shaped in imitation of the usual finish of side bars of vehicles. This coupling-head is provided with lips $l$ $l'$, which extend lengthwise the side spring and across the lapped portions of the two springs and are riveted or otherwise firmly secured to the side spring back of the cross-spring, as shown at $a$ in Figs. 1, 2, 5 of the drawings.

The coupling-head is formed with a shoulder $b$, by which it abuts against the end edge of the side spring and one of the side edges of the cross-spring, and the lip $l'$ is offset to form a shoulder $b'$, by which the coupling is made to abut against the opposite edge of the cross-spring. The construction as thus far described is the same as the patented structure, and it will be seen that while the shoulders $b$ $b'$ prevent lateral play of the cross-spring and longitudinal play of the side spring they do not prevent longitudinal play of the cross-spring nor lateral play of the side spring.

By means of a clip $c$ placed astride the lip $l$ of the coupling-head and having its shank passing through the lapped portions of both springs and provided with the usual nuts on the lower end of said shank the coupling-head receives an additional fastening on the springs, and the lapped portions of the springs are more firmly tied together.

In carrying out my invention I provide the additional lips $l^2$ $l^3$, which extend at right angles to the lips $l$ $l'$ and lengthwise of the cross-spring beyond the inner side of the coupling, and I offset the upper lip $l^2$ to form a shoulder $b^2$, which bears against the inner side edge of the side spring and prevents lateral movement of said side spring by the turning of said spring on the shank of the clip. The clip $c$ has one end bearing against the opposite or outer side edge of the side spring and its other end bearing against the outer surface of the offset of the lip $l^2$ and reinforces its shank and the rivets to prevent lateral play of the side spring in the reverse direction. A rivet or other suitable fastening $a'$ passes through the auxiliary lips $l^2$ $l^3$ and reinforces the shank of the clip $c$ in preventing longitudinal play or shifting of the cross-spring and relieves said shank of a large proportion of the strain and wear to which it has heretofore been subjected. It will thus be seen that by the use of the two additional lips $l^2 l^3$, the shoulder $b'$, and fastening $a'$ I am enabled to secure the ends of the springs more firmly and securely together and to prevent said springs from shifting in the coupling.

From the foregoing description, taken in connection with the accompanying drawings, it is thought that the construction, operation, and advantages of my improved coupling will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a spring-coupling for vehicles, the combination with side and end springs having their end portions crossed or lapped; of a coupling embracing the crossed ends of the springs and having shoulders abutting against the opposite side edges of the cross-spring and end and side edges of the side spring, and fastenings uniting the parts, substantially as described.

2. In a spring-coupling for vehicles, the combination with side and end springs having their end portions crossed or lapped; of a coupling embracing the crossed ends of the springs, and having a shoulder abutting against the end edge of the side spring and one of the side edges of the cross-spring, lips extending lengthwise of the side springs, lips extending lengthwise of the cross-springs, one of the first-named lips being provided with a shoulder bearing against the opposite side edge of the cross-spring, and one of the latter-named lips provided with a shoulder bearing against one of the side edges of the side spring, and fastenings connecting the parts together, substantially as set forth.

In testimony whereof I have hereunto set my hand in presence of two subscribing witnesses.

HENRY K. PELL.

Witnesses:
M. E. MCGILL,
A. L. L. PELL.